Feb. 29, 1944.  A. B. VOSSELLER  2,342,710
AIRCRAFT ENGINE HORSEPOWER COMPUTER
Filed May 25, 1939  2 Sheets-Sheet 1
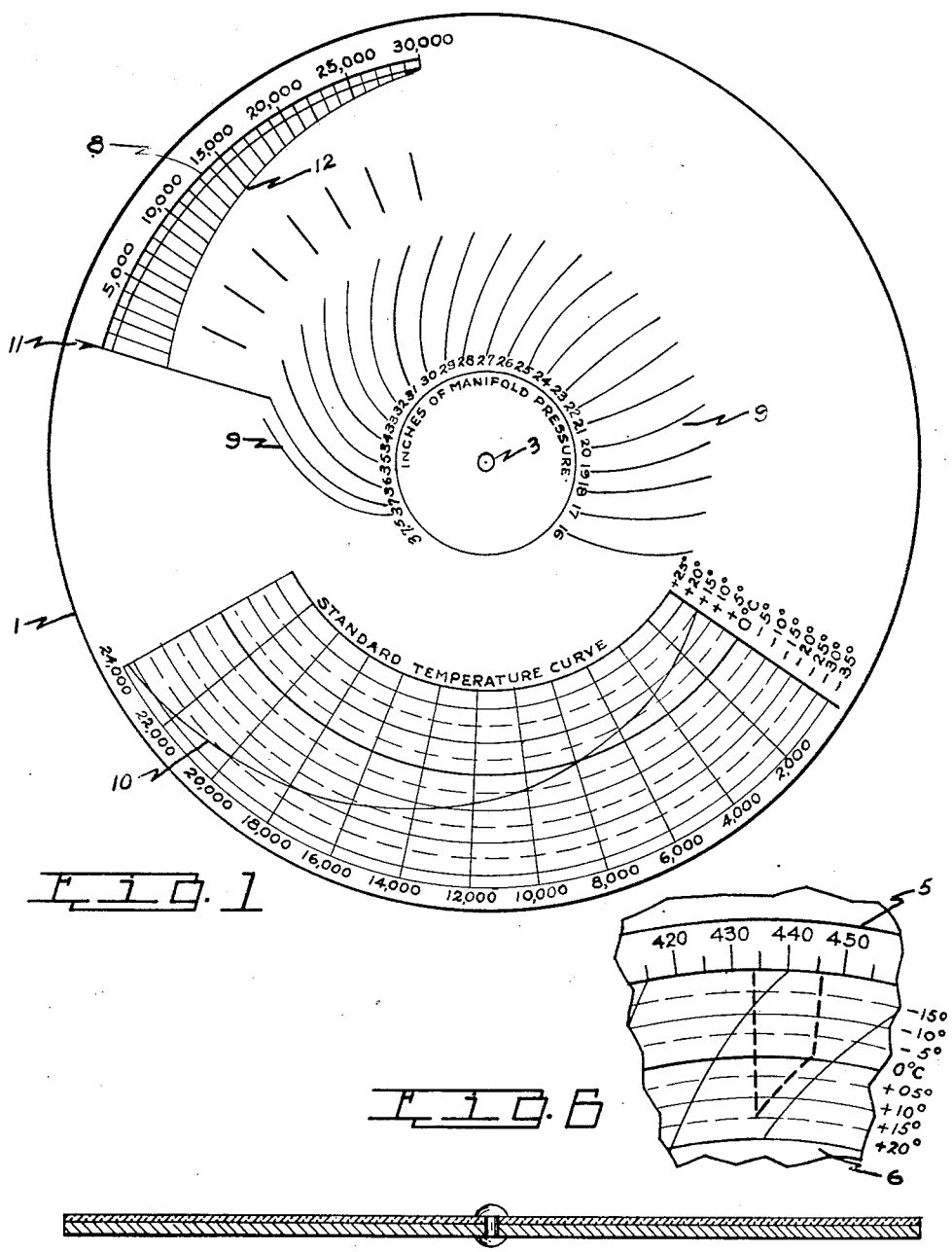
INVENTOR
AURELIUS B. VOSSELLER
BY
ATTORNEY Feb. 29, 1944.  A. B. VOSSELLER  2,342,710
AIRCRAFT ENGINE HORSEPOWER COMPUTER
Filed May 25, 1939  2 Sheets-Sheet 2
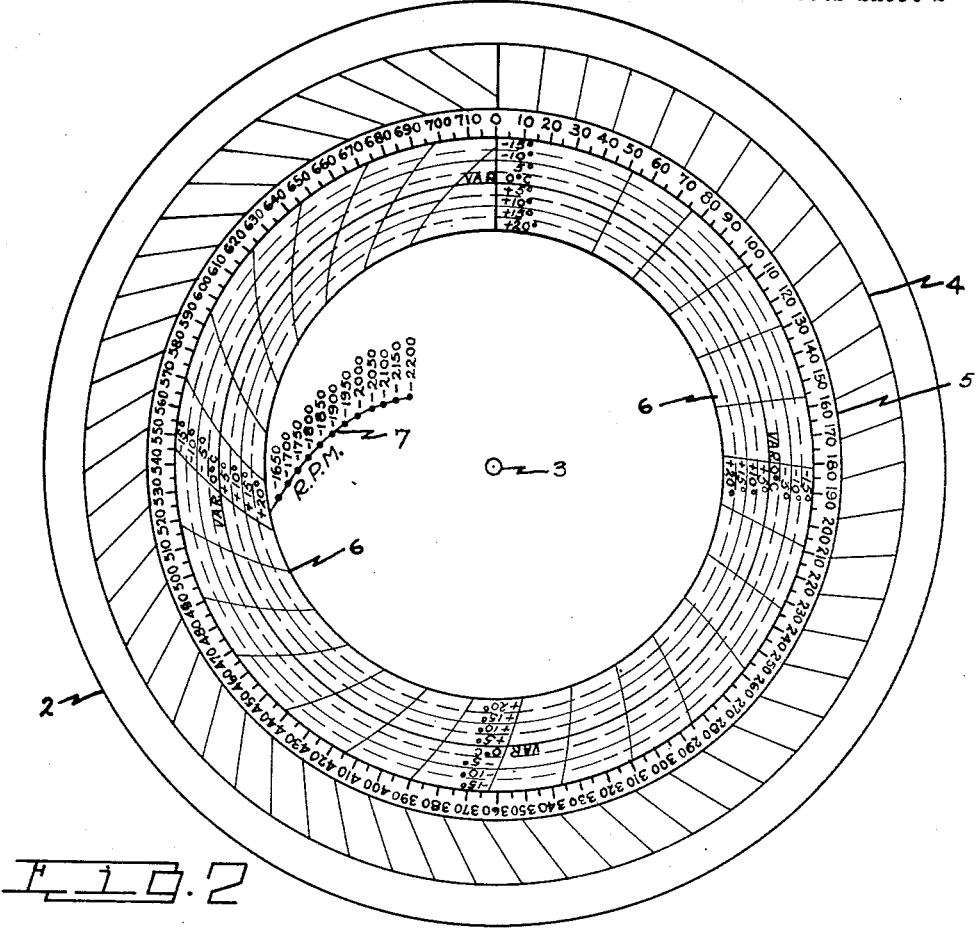
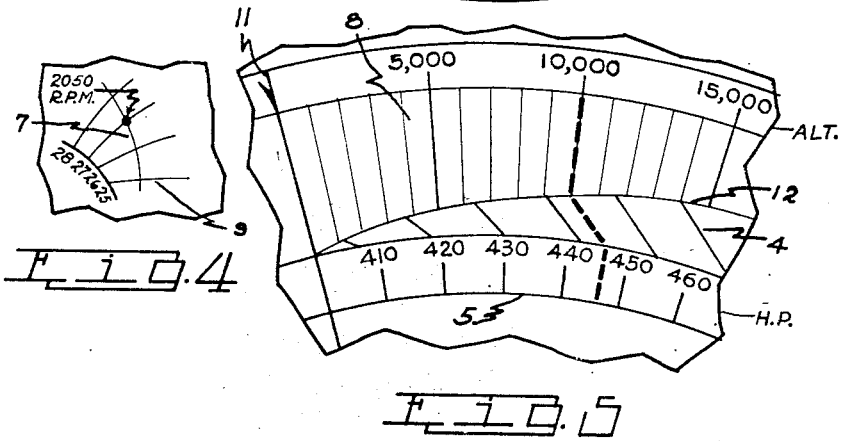
INVENTOR
AURELIUS B. VOSSELLER
BY
ATTORNEY Patented Feb. 29, 1944

2,342,710

UNITED STATES PATENT OFFICE 2,342,710

AIRCRAFT ENGINE HORSEPOWER COMPUTER

Aurelius B. Vosseller, United States Navy

Application May 25, 1939, Serial No. 275,702

2 Claims. (Cl. 235—61)

(Granted under the act of March 3, 1883, as amended April 30, 1928; 370 O. G. 757)

This invention relates to a new and useful mechanical computer, the object of which is to provide a rapid and simple means of calculating the horsepower of aircraft engines under various conditions of manifold pressure, speed of rotation, temperature and altitude.

The practical embodiment of this invention is represented in the accompanying drawings, which form a part of the following specification, in which Fig. 1 is a plan view of the top disk 1.

Fig. 2 is a plan view of the lower or base disk 2.

Fig. 3 is a center line cross-section of the assembled computer.

Fig. 4 is a fragmentary plan section of the assembled computer showing the 27" manifold pressure curve over the R. P. M. scale at 2050 R. P. M.

Fig. 5 is a fragmentary plan section of the assembled computer showing the index, the altitude scale, and the graphs which indicate horsepower variation due to altitude; and Fig. 6 is a fragmentary plan section of the graphs which indicate horsepower variation due to altitude.

The computer comprises an upper disk or chart 1 and a lower or base disk or chart 2 of Celluloid or other suitable material, the upper disk or chart 1 being transparent, except as to the parts under the standard temperature curve 10 and the altitude scale 8. Disks 1 and 2 have the same diameter. Disk 1 is rotatably mounted on pivot 3, which pivot may be rigidly or rotatably mounted in the center of disk 2.

On disk 2 near its periphery is a plurality of graphs 4 indicating horsepower variation due to altitude, disposed in an annulus, said annulus being concentric with disk 2. Adjacent to the inner periphery of said annulus is a circular scale of equally spaced horsepower ratings 5. Extending centerward from the inner periphery of circular scale 5 is a plurality of graphs 6 indicating horsepower variation due to variation in engine temperature, said graphs disposed in an annulus, said annulus being concentric with disk 1. On a curved line extending centerward from the inner limit of graph 6 is an engine speed scale 7 in revolutions per minute.

On disk 1 is a set of manifold pressure graphs 9 disposed in a section of an annulus concentric with disk 2. Below curves 9 is the standard temperature curve 10.

Graphs 6 and 9 shown are plotted in polar coordinates from empirical data furnished by the manufacturer with each engine. In graphs 9 the coordinates are engine speed in R. P. M. as radius, and resultant horsepower, as arc. In graphs 6 the coordinates are difference in temperature of the engine from the standard temperature for the altitude being flown as radius, and resultant horsepower variation as arc.

Near the periphery of disk 2, situated so as to cooperate with graphs 4 on disk 1, is an elevation scale, the length of which covers an arc in units of horsepower equal to a function of the altitude. The altitude or elevation scale 8 is on disc 1 and operates in conjunction with graph 4 on disc 2 in the manner shown in Fig. 5. This elevation scale is not transparent, whereas the balance of disc 1 is transparent. Therefore, only the portion of graph 4 which is unobscured by the elevation scale 8 is visible, as shown in Fig. 5. The elevation scale is indicated by the reference characters 8 and 12. The reference character 11 designates the left extremity or sea level reference mark of the elevation or altitude scale 8.

Following is a description of the method used for developing the manifold pressure curves 9.

The manifold pressure curve for 22 inches of mercury is arbitrarily taken as a straight radial line for the purpose of establishing the engine speed scale in R. P. M. Disk 1 is placed on top of disk 2. The index 11 is set to 310 on the horsepower scale, the horsepower generated by the engine with 22 inches manifold pressure at 2200 R. P. M. at sea level, as taken from the manufacturer's data. On disk 2 at a point over the inner end of the 22 inch manifold pressure line, with the index 11 of disk 1 under the 310 horsepower mark on scale 5 of disk 2, a point is inscribed and marked "2200 R. P. M.," indicating the inner end of the R. P. M. scale. This procedure is repeated using 22 inch manifold pressure and 230 horsepower which is the horsepower generated with 22 inch manifold pressure at 1650 R. P. M. at sea level, and a mark is inscribed on disk 2 under the outer end of the 22 inch manifold pressure line and labeled "1650 R. P. M." These two points mark the limits of R. P. M. scale 7. The 22 inch manifold pressure line is arbitrarily shown in Fig. 1 as being a substantially straight line for convenience, although it could be given any desired curvature which would then affect the shape of the other curves, although the accuracy, method of construction and operation would not be affected. This line is the base line used in establishing the various curves on the device and its length can be arbitrarily chosen in making up the device in order to achieve the sizes and proportions desired.

The procedure is repeated placing the index 11 on the horsepower generated by 22 inch manifold pressure and 1700 R. P. M., and where the 22 inch manifold pressure line crosses the R. P. M. line a mark is inscribed and labeled "1700 R. P. M." The procedure is repeated again for 1750 R. P. M., 1800 R. P. M., etc.

Replacing the disks in their normal relative position, two concentric circles forming an annulus are struck off on disk 2, using pivot 3 as a common center and the limits that is to say the distance between the inner and outer ends of the 22 inch manifold pressure line as a radius. The empirical data on engine performance, as indicated by the relation of manifold pressure, R. P. M. and horsepower furnished by the manufacturer is then plotted in the annulus. It is a polar plot using the R. P. M. scale as the radius and the horsepower as the arc or angle, and the graph is the resultant manifold pressure. The index 11 is placed at the horsepower on scale 5 generated by the engine when making 2200 R. P. M. at 23 inch manifold pressure, as furnished by the manufacturer's data, and a point inscribed over the 2200 R. P. M. mark. This is repeated for all combinations of R. P. M. with 23 inch manifold pressure, to establish the 23 inch manifold pressure graph. The same procedure is used to establish the other manifold pressure graphs.

The horsepower variation due to altitude, of an engine operating with a fixed manifold pressure and R. P. M. combination, is a function of the altitude; but the magnitude of that function increases with each increase in the sea level horsepower. It is a variable function. In other words, when the relations of altitude versus resultant horsepower variation are plotted, different graphs result with each initial sea level horsepower used, and the steepness of each graph varies with the initial horsepower used. For convenience the inventor has broken down this variable function represented by a family of graphs, into a constant function, represented by scale 8, and a variable function represented by the family of graphs 4. The curved line 12, part of scale 8, is plotted so as to divide the width of the annulus containing graphs 4 at each altitude indicated on scale 8, into such parts that the ratio of the part disclosed, to the whole width of the annulus, is the same as the ratio of the altitude indicated, to 30,000 feet.

The horsepower subtended under each graph in ring 4 represents the total variation due to 30,000 feet elevation, of the sea level horsepower, as indicated by the index 11, less the constant factor of this correction represented by scale 8. The graphs in ring 4 are plotted by plotting the inner limit of the particular graph as the horsepower developed at 30,000 feet, as given by the performance data; and the outer limit at a point equal to the sea level horsepower plus the constant part of the correction for 30,000 feet altitude.

The standard temperature curve 10 is a polar plot of the standard temperature at various altitudes, as furnished by the performance data. The readings above the curve are colored red and are minus corrections; those below are white and are plus corrections. The polar plot of the standard temperature curve is used for quickly determining the difference between standard temperature and the air temperature experienced at any time. The power curves of any engine are based upon standard temperatures and consequently any variation therefrom necessitates a correction in power which is additive if the actual temperature is lower than standard, subtractive if greater. The area above, or probably more properly (referring to the polar plot itself and not to the magnitude of the values) inside the curve is colored red to correspond with the similarly colored part of ring 6 indicating positive values. This coloration is applied merely to reduce the chance of the operator becoming confused. An example will doubtless help to clarify this: If the air temperature at 8,000 should be 15° C., the indicated correction would be 15°, and it would lie in the red area. This 15° correction when applied to the ring 6 would indicate that the correction was to be applied there also in the red area and would result (through following the curved radial lines in ring 6 in a counterclockwise direction) in a minus correction to the horsepower indicated.

Ring 6, a fragment of which is shown in Fig. 6, contains 9 equi-distant concentric circles, representing 5° C. increments of temperature from minus 20° C. to plus 20° C. The curves in this ring represent the horsepower correction due to the difference in temperature of the carburetor and the standard temperature for the altitude at which the temperature is read. Here also the difference in horsepower correction due to each degree difference in temperature is greater with a greater developed horsepower, hence the progressively increased slant of the curves. These curves are also plotted from the temperature correction tables or curves, which are included in the performance data furnished by the manufacturer. The points for these curves are plotted by picking off the correction in horsepower for each 5° C. variation from standard temperature at each 25 horsepower increment. E. g. at 500 horsepower minus 5° C. variation from standard at the altitude being flown the correction is plus 5 horsepower and a point on the minus 5° C. concentric circle is inscribed so that a radial line through it will intersect scale 5 at 505 horsepower. Points are similarly inscribed on the plus 20° C., plus 15° C., plus 10° C., etc. circles and joined by a fair curve. The annulus bounded by the 0° C. circle and the plus 20° C. circle is colored red, indicating a minus correction. The horsepower is read from scale 5. The operation of picking off horsepower is illustrated in Fig. 5. This shows the altitude scale in juxtaposition with the horsepower scale 5, it having been so arranged by the act of properly matching R. P. M. with manifold pressure. For a given R. P. M. and manifold pressure, the power generated will vary with the altitude at which the conditions exist. Thus, at 10,000 feet, as shown in the example, Fig. 5, the horsepower would be approximately 446. Had the altitude been 5,000 feet, the horsepower would be approximately 424. In the same way, had these conditions existed at sea level there would have been no correction for altitude and the horsepower would be approximately 400.

The following directions for use are printed on the back of the computer:

*For 1535-72 engine—Directions for use.*—There are four variables in determining horsepower, i. e., manifold pressure, engine speed in R. P. M., altitude and temperature. Turn the top disc until the proper manifold pressure line lies on the R. P. M. being used. Maintaining the two discs in this position the horsepower may now be read off opposite the altitude scale. The sea level horsepower is read at the arrow at zero altitude, Fig. 5. For higher altitudes follow the guide lines, see Fig. 5. For example, if altitude is 10,000 feet procedure is as shown in dotted lines, or 446 horsepower (see Fig. 5). This gives the horsepower without any temperature correction. To apply this correction (still without moving the disc), plot on the standard temperature curve the carburetor air temperature, actually read off the thermocouple, against the altitude at which you are flying, and note on the curve the deviation of your temperature from standard. This need not be actually plotted, since a glance is sufficient to determine this temperature deviation. Note whether it is in the red (minus correction) or white (plus correction) area. With this deviation go to the uncorrected horsepower and follow the spirals into either the red or white to obtain corrected horsepower. For example, a temperature of plus 10° C. at 10,000 gives a deviation of 15° in the red. Taking this to the red and white concentric circles and following the spiral back shows a correction to about 434 horsepower. (See Fig. 6.) The condition of R. P. M. and manifold pressure necessary (at any desired altitude and temperature conditions) to obtain any desired horsepower output can also be obtained by working the above process backward.

It is contemplated that the fuel consumption in gallons per hour will be entered in the space provided around the rim for each individual engine.

The invention described herein may be manufactured and/or used by or for the Government of the United States of America for governmental purposes without the payment of any royalties thereon or therefor.

I claim:

1. A base chart having a circumferential scale of horsepower and a series of points indicating the revolutions per minute of an internal combustion engine, a transparent chart rotatably mounted thereon containing a radial line and a series of curves indicating the intake manifold pressures such that when any manifold pressure curve is moved over a particular one of said points the radial line will indicate the horsepower of the particular engine for which the charts were made, a series of correction curves arranged circumferentially on said base chart and running into said horsepower scale, a circumferential scale of altitudes on said transparent chart beginning with zero altitude on said radial line, and a starting curve intersecting said altitude scale at points spaced from the horsepower scale proportional to the altitude, whereby the corrected horsepower for any particular altitude may be read on the horsepower scale at the end of the correction curve which intersects the proper altitude line at its intersection with said starting curve.

2. A base chart having a circumferential scale of horsepower and a series of points indicating the revolutions per minute of an internal combustion engine, a transparent chart rotatably mounted thereon containing a radial line and a series of curves indicating the intake manifold pressures such that when any manifold pressure curve is moved over a particular one of said points the radial line will indicate the horsepower of the particular engine for which the charts were made, a series of correction curves arranged circumferentially on said base chart and running into said horsepower scale, a circumferential scale of altitudes on said transparent chart beginning with zero altitude at said radial line, a starting curve intersecting said altitude scale at points spaced from the horsepower scale proportional to the altitude, whereby the corrected horsepower for any particular altitude may be read on the horsepower scale at the end of the correction curve which intersects the proper altitude line at its intersection with said starting curve, a series of concentric circles on said base chart representing degrees above and below standard temperatures, a series of temperature correction curves on said transparent chart extending across said concentric circles such that by starting at the intersection of the horsepower line radius and the standard temperature circle and following the corresponding temperature correction curve to the circle representing the proper temperature variation from standard, the corrected horsepower may be read along the radius at that point.

AURELIUS B. VOSSELLER.